United States Patent
Nellen et al.

(10) Patent No.: US 11,273,693 B2
(45) Date of Patent: Mar. 15, 2022

(54) ROOF SYSTEM FOR A VEHICLE

(71) Applicant: Inalfa Roof Systems Group B.V., Oostrum (NL)

(72) Inventors: Marcel Johan Christiaan Nellen, Merselo (NL); Rainer Gerhard Jungling, Dusseldorf (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 16/673,414

(22) Filed: Nov. 4, 2019

(65) Prior Publication Data
US 2020/0139796 A1     May 7, 2020

(30) Foreign Application Priority Data
Nov. 5, 2018    (EP) .................................... 18204343

(51) Int. Cl.
| | |
|---|---|
| *B60J 7/043* | (2006.01) |
| *B60J 7/047* | (2006.01) |
| *B60J 7/057* | (2006.01) |
| *F16B 17/00* | (2006.01) |

(52) U.S. Cl.
CPC ............ *B60J 7/047* (2013.01); *B60J 7/0435* (2013.01); *B60J 7/0573* (2013.01); *F16B 17/006* (2013.01)

(58) Field of Classification Search
CPC ... B60J 7/024; B60J 7/026; B60J 7/028; B60J 7/053; B60J 7/057; B60J 7/047; B60J 7/0435; B60J 7/043
USPC .......................... 296/216.02–216.05, 220.01
See application file for complete search history.

(56) References Cited

U.S. PATENT DOCUMENTS

| | | |
|---|---|---|
| 4,407,541 A | 10/1983 | Boots |
| 4,417,763 A | 11/1983 | Schlapp et al. |
| 4,619,480 A | 10/1986 | Motoyama et al. |
| 4,630,859 A | 12/1986 | Bienert et al. |
| 4,647,104 A | 3/1987 | Kohlpaintner et al. |
| 4,647,106 A | 3/1987 | Furst |
| 4,671,565 A | 6/1987 | Grimm et al. |

(Continued)

FOREIGN PATENT DOCUMENTS

| | | |
|---|---|---|
| DE | 3442600 A1 | 5/1986 |
| DE | 3536184 C1 | 11/1986 |

(Continued)

OTHER PUBLICATIONS

European Search Report, dated May 20, 2019 for corresponding European Patent Application No. 18204343.0, filed Nov. 5, 2018.

*Primary Examiner* — Dennis H Pedder
(74) *Attorney, Agent, or Firm* — Steven M. Koehler; Westman, Champlin & Koehler, P.A.

(57) ABSTRACT

A roof system for a vehicle having an opening in a roof includes a panel and a guide rail at each longitudinal side of said opening. An operating mechanism operates the closure panel in a longitudinal direction of the vehicle. The operating mechanism includes a front device including a lever for moving the front edge of the panel in a vertical direction. A driving slide is slidably accommodated in each guide rail and is drivable by a drive member. The lever is connected to the driving slide through a pin-curve assembly and is provided with a slide-shoe. A curve of the pin-curve assembly has a first curve section extending horizontally allowing a pin to slide along to move the rear of the panel vertically. A locking curve section extends mainly in vertical direction to allow the driving slide to rotate the lever.

13 Claims, 6 Drawing Sheets

(56) References Cited

U.S. PATENT DOCUMENTS

| | | |
|---|---|---|
| 4,684,169 A | 8/1987 | Igel et al. |
| 4,725,092 A | 2/1988 | Reintges et al. |
| 4,752,099 A | 6/1988 | Roos et al. |
| 4,877,285 A | 10/1989 | Huyer |
| 4,893,869 A | 1/1990 | Fuerst |
| 4,984,332 A | 1/1991 | Bienert et al. |
| 4,995,667 A | 2/1991 | Tamura et al. |
| 5,020,849 A | 6/1991 | Schlapp et al. |
| 5,028,090 A | 7/1991 | Huyer |
| 5,058,947 A | 10/1991 | Huyer |
| 5,066,068 A | 11/1991 | Suzuki et al. |
| 5,154,482 A | 10/1992 | Hayashi et al. |
| 5,238,290 A | 8/1993 | Farmont |
| 5,259,662 A | 11/1993 | Huyer |
| 5,288,125 A | 2/1994 | Huyer |
| 5,325,585 A | 7/1994 | Sasaki et al. |
| 5,527,085 A | 6/1996 | Ochiai et al. |
| 5,593,204 A | 1/1997 | Wahl et al. |
| 5,618,081 A | 4/1997 | Nabuurs |
| 5,765,907 A | 6/1998 | Nabuurs |
| 5,845,959 A | 12/1998 | Ueki |
| 5,879,049 A | 3/1999 | Sinelli |
| 6,164,128 A | 12/2000 | Santa Cruz et al. |
| 6,164,718 A | 12/2000 | Stallfort |
| 6,257,658 B1 | 7/2001 | Nabuurs et al. |
| 6,325,453 B1 | 12/2001 | Manders |
| 6,343,833 B1 | 2/2002 | Manders |
| 6,390,544 B1 | 5/2002 | Manders et al. |
| 6,419,310 B1 | 7/2002 | Manders |
| 6,471,286 B1 | 10/2002 | Manders et al. |
| 6,513,866 B1 | 2/2003 | Manders |
| 6,957,851 B2 | 10/2005 | Manders et al. |
| 8,322,783 B2 | 12/2012 | Manders |
| 9,969,246 B2 | 5/2018 | Nellen et al. |
| 2004/0007902 A1 | 1/2004 | Manders et al. |
| 2004/0222675 A1 | 11/2004 | Oberheide |
| 2007/0228779 A1 | 10/2007 | Stallfort |
| 2011/0285181 A1 | 11/2011 | Manders |
| 2018/0326821 A1 | 11/2018 | Heidan |

FOREIGN PATENT DOCUMENTS

| | | |
|---|---|---|
| DE | 3603314 A1 | 8/1987 |
| DE | 3920372 C1 | 8/1990 |
| DE | 3930756 A1 | 3/1991 |
| DE | 4101288 A1 | 7/1991 |
| DE | 9116421 U1 | 11/1992 |
| DE | 9116412 U1 | 12/1992 |
| DE | 4405742 C1 | 5/1995 |
| DE | 19514585 A1 | 10/1996 |
| EP | 0033816 A1 | 8/1981 |
| EP | 0143589 A2 | 6/1985 |
| EP | 0218890 A1 | 4/1987 |
| EP | 0292730 A2 | 11/1988 |
| EP | 0296644 A2 | 12/1988 |
| EP | 0343750 A1 | 11/1989 |
| EP | 0373692 A2 | 6/1990 |
| EP | 0437283 A1 | 7/1991 |
| EP | 0517318 A1 | 12/1992 |
| EP | 0543427 A1 | 5/1993 |
| EP | 0638452 A1 | 2/1995 |
| EP | 0747249 A1 | 12/1996 |
| EP | 0899140 A1 | 3/1999 |
| EP | 1095807 A1 | 5/2001 |
| EP | 2108536 A2 | 10/2009 |
| EP | 2263896 A1 | 12/2010 |
| EP | 3401144 A1 | 11/2018 |
| FR | 2495068 A1 | 6/1982 |
| FR | 2527995 A1 | 12/1983 |
| GB | 2078295 A | 1/1982 |
| JP | 0278422 U | 6/1990 |
| WO | 0006403 A2 | 2/2000 |
| WO | 2010088951 A1 | 8/2010 |

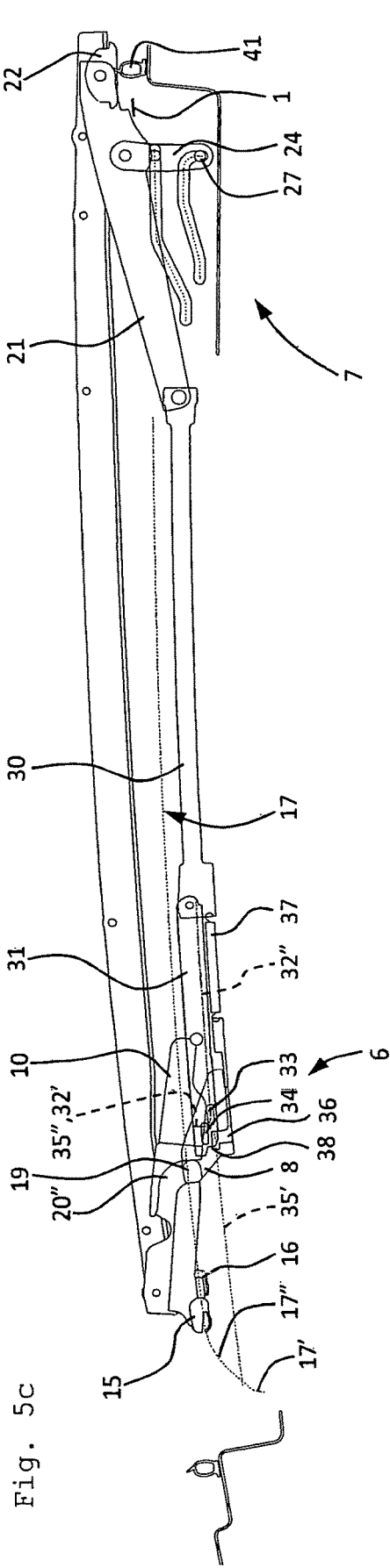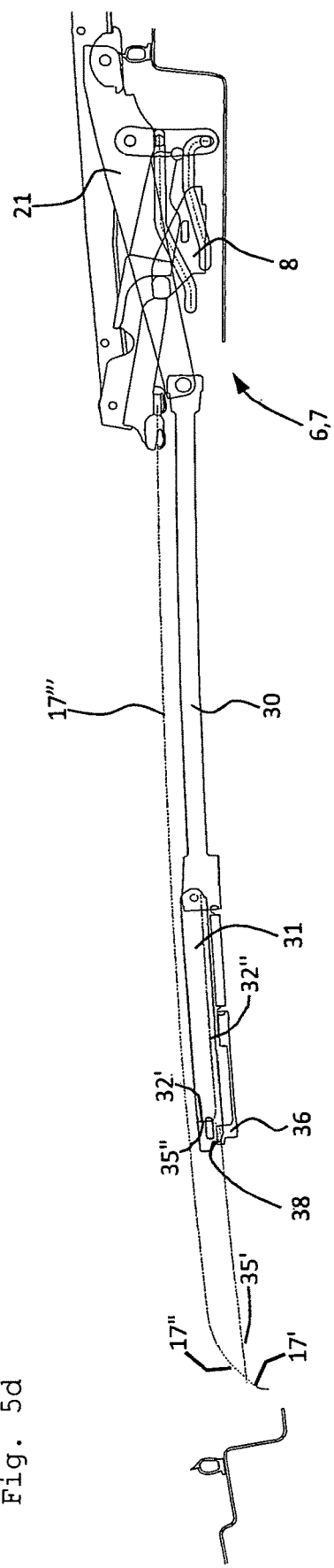
Fig. 5c
Fig. 5d

ROOF SYSTEM FOR A VEHICLE

BACKGROUND

The discussion below is merely provided for general background information and is not intended to be used as an aid in determining the scope of the claimed subject matter.

Aspects of the invention relate to a roof system for a vehicle having a roof opening in a roof part thereof. The roof system includes at least a closure panel which is movable between a closed position in which it closes the roof opening and an open position in which it opens the roof opening, where the closure panel is positioned at least partially above an adjoining portion of the roof part. A stationary guide rail is provided at each longitudinal side of said roof opening and is configured for slidably guiding an operating mechanism that operates the closure panel in a longitudinal direction of the vehicle. The operating mechanism includes a rear device for moving the rear edge of the closure panel towards a raised position relative to the closed position and above the adjoining portion of the roof part; a front device having a lever for moving the front edge of the closure panel in a vertical direction; and a driving slide which is slidably accommodated in each guide rail and is drivable by a drive member in order to move the closure panel both in vertical and in horizontal direction through the front device and rear device.

A panel bracket of the panel is provided with a front slide shoe, while the lever of the front device is provided behind the front slide-shoe.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

To improve the assembly described in the Background, the lever of the front device is connected to the driving slide through a pin-curve assembly. The front slide-shoe is in engagement with a stationary guide curve and is pivotally in engagement with the closure panel, wherein preferably a curve of the pin-curve assembly is provided with a first curve section extending mainly in horizontal direction and allowing a corresponding pin to slide along and thereby allowing the driving slide to move at least the rear side of the closure panel at least in vertical direction, and is provided with a locking curve section extending mainly in vertical direction when a corresponding pin is positioned in the locking curve section in order to allow the driving slide to rotate the lever due to a displacement of the slide-shoe of the lever through a curved front portion of the stationary guide curve and to slide the closure panel in longitudinal direction.

By pivotally connecting the panel to the lever and by supporting the lever by a front slide-shoe, the panel does not need a slide-shoe in front of the lever, thereby allowing the lever and the driving slide to be positioned at the front of the panel and allowing the front device to be made relatively compact as it requires only a lever with integrated front slide-shoe and a driving slide. This all means that it is possible to slide the panel very far rearwardly, thus enabling the panel to open the roof opening to a large extent.

Providing the front slide-shoe on the lever of the front device, instead of on a panel bracket may also offer the advantage that the modularity of the roof system is improved. That is when the operating mechanism is used for different panels, i.e. different lengths of panels, the front device may remain the same, and only the panel bracket must be adapted as well as the connecting member, connecting the front device with the rear device. Now that the front slide-shoes are on the lever of the front device instead of on the panel bracket, the panel bracket can be made much simpler due to the lack of a slide-shoe, and thus it does not require complicated tools to make different panel brackets with slide shoes.

Preferably, the locking curve section and the first curve section of the pin-curve assembly are provided in the lever and the corresponding pin is provided on the driving slide.

This allows the driving slide to be very compact and very narrow, seen in transverse direction, enabling it to move far rearwardly without causing space problems at the rear.

In one embodiment, the lever of the front device is in engagement with two stationary guide curves one on each lateral side of the lever by means of two slide-shoes.

This makes the front support of the panel very stable.

It is preferred that the slide-shoes are positioned at the front end of the lever of the front device.

This is favorable in view of stability in a transverse and in a longitudinal direction, as well as in view of compactness.

Furthermore, the lever of the front device is preferably pivotally connected to the panel at a position substantially above the slide-shoe, as this further increases stability and compactness.

The stationary guide curve may include a short substantially vertical front portion, a connecting inclined portion and a connecting long portion following the curvature of the roof part.

In one embodiment, the lever of the front device is rotationally supported at its rear end on a pivot which is mounted on a slide which is slidable in the stationary guide rail.

Providing the lever of the front device with its own slide enables a stable support of the rear end of the lever.

The rear device may be adapted to move the rear side of the panel in vertical direction and to allow the panel to slide with respect to the rear device when it moves above the adjoining portion of the roof part.

This allows the rear device to be positioned near the rear side of the roof opening in all positions of the panel and without requiring a guide rail behind the roof opening. This makes it possible to form the roof system as a so-called top loader in which the frame is assembled to the vehicle roof from above, which makes assembly much easier compared to other assembly systems.

The rear device may include a lifting lever which is coupled to the driving slide to move the rear side of the panel in vertical direction and which is uncoupled from the driving slide when the panel is moved above the adjoining portion of the roof part.

In one embodiment, the lifting lever is supported by an auxiliary lever which is pivotally connected to the lifting lever, and which is in engagement with two guide curves to force the auxiliary lever to rotate when the lifting lever is driven by the driving slide.

Preferably, the auxiliary lever is oriented substantially vertically in the upper position of the lifting lever to obtain a stable support of the lifting lever.

The rear device may be provided with a coupling to couple the rear device to the driving slide in order to move the rear side of the panel in vertical direction and to couple the rear device to the stationary guide rail in order to move the panel above the adjoining portion of the roof part.

The rear device may be connected to the coupling by an elongated connecting member.

Preferably, the front and rear devices are configured such that the front device is positioned at least partly beside the rear device in the rear position of the panel. This enables the driving slide to be moved rearwardly to a large extent, leading to a large opening area of the panel. The large opening area of the panel requires a very stable support of the front and the rear device in that position of the panel. This stable support in longitudinal direction is obtained by placing the slide shoes at the very front of the front device and the driving wedge support to the panel bracket, auxiliary lever and the auxiliary lever support to the stationary guide rail be placed at the very rear with regard to the opening of the roof. As such, the distance between the slide shoes at the front and the auxiliary lever support to the guide rail at the rear forms the support basis. The larger the distance the better the support for the panel when the panel is in the fully open position. The stability in transverse direction is improved by the slide shoes at the front which have a transverse spacing with regard to each other and are supported by the stationary guide rail. In the open position of the panel, the front device is able to slide partly adjacent to the transverse inner side of the rear device. In this way it becomes possible that the driving slide is also positioned adjacent to the transverse inner side of the rear device in a most rearward position. As the driving slide is connected to the drive cable, the drive cable can be routed to the drive motor in an advantageous routing. The drive motor may be positioned at the rear of the opening in the roof and lies approximately at the longitudinal centerline of the roof opening. For this reason the drive cable can be routed such that it runs in a radius away from the area at the rear of the driving slide in a transverse direction towards the drive motor. Because the rear device is not in the way of the drive cable routing, the drive cable routing does not have to be directed around the rear device, this is a further aspect that improves the opening distance of the panel.

BRIEF DESCRIPTION OF THE DRAWINGS

Further details and advantages of aspects of the invention will become more clear from the following description of embodiments of the roof system with reference to the drawings.

FIGS. 5A-5D are simplified side views of the operating mechanism on one side of the panel in four different positions.

DETAILED DESCRIPTION OF THE ILLUSTRATIVE EMBODIMENTS

Figure 1:
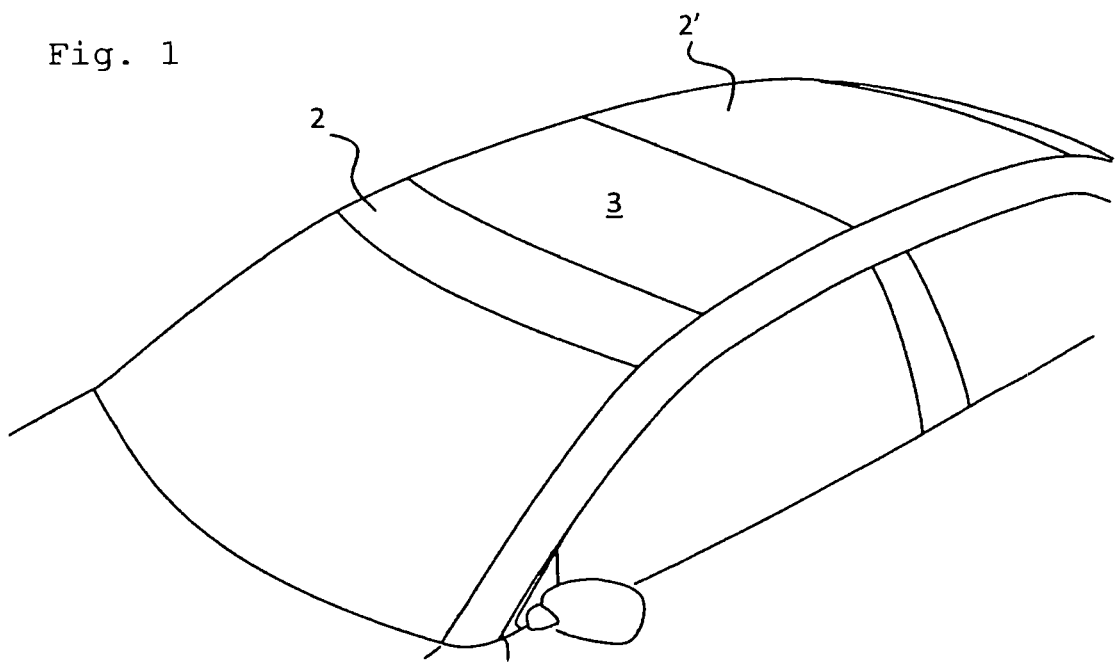
FIGS. 1 and 2 are partial perspective views of an automobile provided with a roof system with the closure panel of the roof system in a closed and open position.
Figure 2:
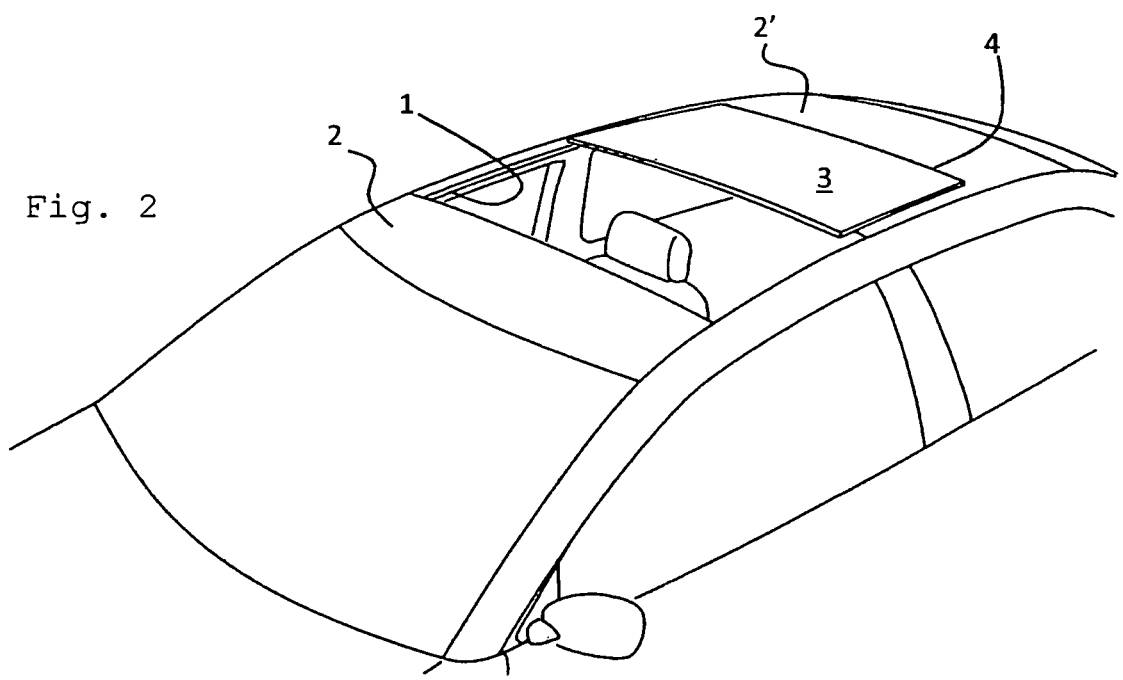

FIGS. 1 and 2 show part of a vehicle, in particular an automobile, which comprises at least a roof opening 1 (FIG. 2) defined in a (stationary) roof part 2. A closure, here in the form of a closure panel 3, is movable between a closed position (FIG. 1) in which it closes the roof opening 1, and an open position (FIG. 2) in which it opens the roof opening 1 and in which it is positioned at least partially above the roof part 2, here the fixed roof part adjoining the rear edge of the roof opening 1.

As is known per se such a roof system (which is also known as a spoiler roof or exterior sliding roof) could comprise additional elements, such as for example a tiltable wind deflector positioned ahead of the roof opening 1, or further movable or stationary panels, for example in a position behind the panel 3 when it is in its closed position. In fact, in the present embodiment, the roof part behind the roof opening 1 is formed by a roof panel 2' which may be a stationary roof panel or a movable panel.

Figures 3A, 3B:
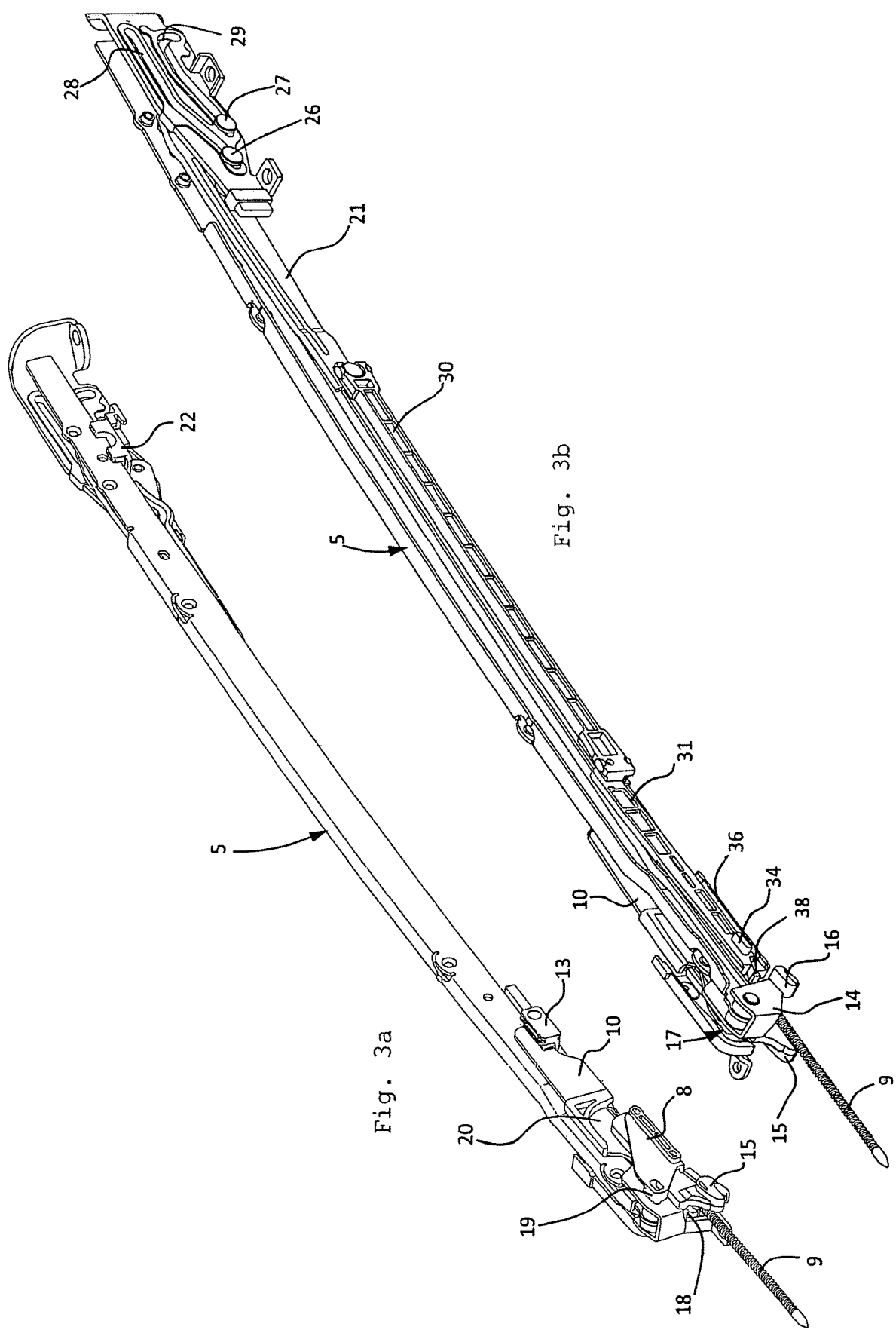
FIGS. 3A and 3B are perspective views of the operating mechanism for the panel on the left and right side thereof.
Figure 4:
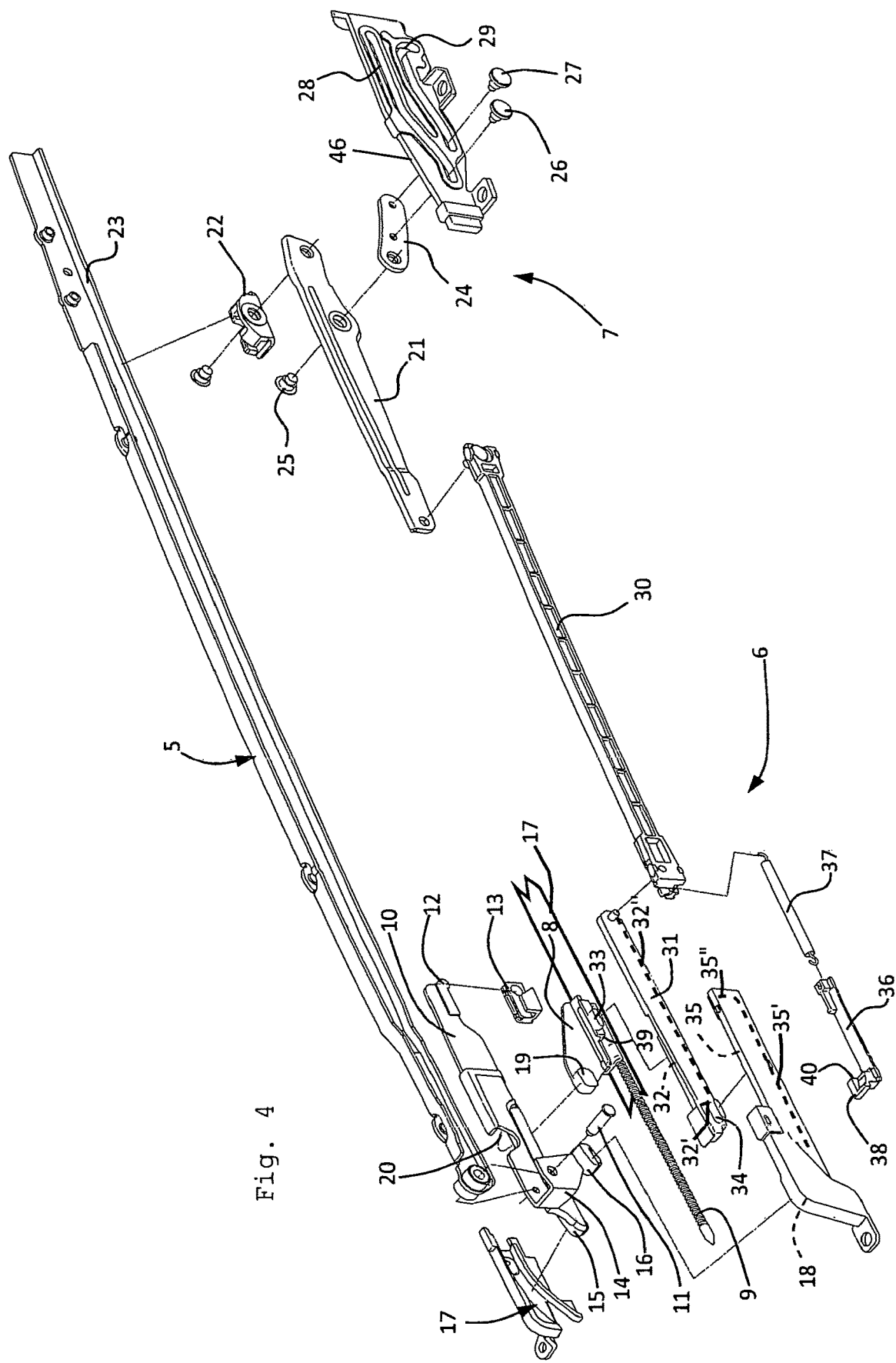
FIG. 4 is an exploded view of the parts of the operating mechanism on the left side of the closure panel.

FIGS. 3A, 3B and 4 show the parts of an operating mechanism for closure panel 3 in order to move it between the closed and open positions. One of the longitudinal sides of closure panel 3 is shown in FIG. 4, and it is noted that the same parts albeit in mirror image are present on the other longitudinal side of panel 3, which is shown in FIGS. 3A and 3B showing the operating mechanisms on both sides of the panel 3. The panel 3 comprises for example a glass or plastic transparent or metal non-transparent sheet 4 supported on the longitudinal sides by a panel bracket 5 fixed to sheet 4, for example by encapsulation material and/or any other means. At each longitudinal side edge of roof opening 1 there is provided a stationary guide rail (not shown) having several guide grooves in which parts of the operating mechanism are slidably guided. The guide rails are straight or slightly curved in order to follow the curvature of the vehicle roof. Such guide rails are shown for example in U.S. Pat. No. 9,969,246, the contents of which are incorporated herein by reference thereto.

To move closure panel 3 in longitudinal (along the guide rail) and vertical (substantially perpendicular to the guide rail) directions, the operating mechanism comprises a front device 6 to move the front side of closure panel 3 in horizontal and vertical direction and a rear device 7 to move the rear side of closure panel 3, in this case mainly in vertical direction, i.e. up and down. In this embodiment, rear device 7 is not or hardly not used for sliding panel 3 in longitudinal direction, but rear device 7 is adapted to allow panel 3 to slide with respect thereto when front device 6 moves panel 3 in longitudinal direction. This will be further explained below.

As is shown in FIGS. 3 and 4, front device 6 is driven by a driving slide 8 connected to a drive cable 9 or other elongated drive member in engagement with a drive motor (not shown), in particular an electric drive motor, or a manual drive to move drive cable 9 back and forth. Driving slide 8 is permanently in engagement with a lever 10 which is pivotally connected to panel bracket 5 through a pivot pin 11. Lever 10 is symmetrically supported on its rear end by a pivot 12 on a slide 13 which is slidable in the stationary guide rail. On its front end, lever 10 is extended in lateral direction by a lateral extension 14 and comprises two slide-shoes 15 and 16 on the lateral sides of lever 10 to support it in the stationary guide rail. The slide-shoes 15, 16 are slightly offset in longitudinal direction, for example due to space restraints caused by the wind deflector. Because slide-shoes 15, 16 are on lever 10 instead of on panel bracket 5, and because there is a normal pivot 11 between panel bracket 5 and lever 10, movements of panel 3 due to external forces cause a pivoting movement at the position of pivot 11, not at the position of offset slide-shoes 15, 16, thereby avoiding offset slide-shoes at panel bracket 5 to twist panel bracket 5 which could result in stalling or heavy running of panel 3.

The stationary guide rail is provided on its front end with a plastic insert, one for each slide-shoe 15, 16 and forming the front portion of the stationary guide curves 17, 18. They include a short substantially vertical front curve portion 17', 18', a rearwardly connecting and upwardly inclining curve portion 17", 18" gradually curving to a long portion 17''', 18''' formed by a groove in the main portion of the stationary guide rail made as an aluminium extruded part (see dotted line 17''' in FIG. 5C). The plastic inserts of stationary guide curves 17, 18 are clicked or bolted or otherwise attached to the aluminium extruded part.

Driving slide 8 and lever 10 are in engagement with each other through a pin-curve assembly, here including a pin 19 on driving slide 8 and a curve 20 in lever 10. Curve 20 comprises a front curve section 20' extending substantially parallel to the stationary guide rail (with lever 10 in its lower position) and a rear locking curve section 20" extending substantially perpendicular to the stationary guide rail (with lever 10 in its upper position), see FIGS. 5A-5D. A curved section between both sections 20' and 20" is used to rotate lever 10 and is in fact a guide curve section.

The rear device 7 includes a lifting lever 21 having a pivotable slide shoe 22 on its rear end with which lifting lever 21 is slidably in engagement with a panel rail 23 on panel bracket 5 to allow panel 3 to slide with respect to lifting lever 21 of rear device 7. The lifting movements of lifting lever 21 are controlled by an auxiliary lever 24 pivotally connected to lifting lever 21 by a pivot 25 between the front and rear end of lifting lever 21. Auxiliary lever 24 is provided with two guide pins 26 and 27 in engagement with corresponding guide curve 28 and 29 in a stationary support 46. The curves of guide curves 28 and 29 are such that the rear end of lifting lever 21 is lifted when it is sliding rearwardly. The auxiliary lever 24 extends substantially perpendicularly to the stationary guide rail when lifting lever 21 is in its rear position in which panel 3 may slide with respect to rear device 7 which is stationary then.

To move lifting lever 21 of rear device 7, it can be coupled to driving slide 8. For this purpose, the front end of lifting lever 21 is pivotally connected to the rear end of elongate connecting member 30. The front end of elongate connecting member 30 is pivotally connected to pivotable coupling member 31, which is provided with a coupling curve 32 which can be coupled to a coupling cam 33 on driving slide 8. The coupling curve 32 is on the back side of the coupling member 31 as is shown with dashed lines in FIGS. 4 and 6. The coupling curve 32 includes a substantially vertical locking curve 32' and a horizontal portion 32". When the coupling member 31 is pivoted down as in FIGS. 5a and 5b, coupling cam 33 of driving slide 8 is positioned in the substantially vertical locking curve portion 32' of coupling curve 32. The driving slide 8 is drivingly coupled with rear device 7 (via coupling member 31 and connecting member 30) so that driving slide 8 is driving lifting lever 21 of rear device 7.

The driving slide 8 can be uncoupled from driving lifting lever 21 by positioning the cam 33 in the horizontal portion 32" of coupling curve 32 with pivotal movement upward of the coupling member 31 as illustrated in FIG. 5c. Due to upward pivoting movement of coupling member 31, coupling cam 33 on driving slide 8 is transferred from vertical coupling curve portion 32' of coupling curve 32 to parallel portion 32" thereof so that a further rearward movement of driving slide 8 can be done without moving coupling member 31, so that front device 6 is operated, while rear device 7 remains stationary.

Coupling member 31 is provided on its front end with a locking cam 34 engaged in a stationary locking curve 35 including a releasing curve portion 35' extending parallel to the stationary guide rail and a substantially vertical locking curve portion 35". The locking curve 35 is on the back side of stationary guide curve 18 and is shown in dashed lines in FIG. 4. To ensure that locking cam 34 remains in locking curve portion 35" when panel 3 is moved from its open position to its closed position, there is provided a locking slide 36 connected to the front end of coupling member 31 through a pull spring 37. The front end of locking slide 36 is provided with a locking surface 38 which is positioned below the front portion of coupling member 31 when the coupling member 31 is pivoted upwardly (FIG. 5c). Driving slide 8 and locking slide 36 comprise unlocking surfaces 39, 40, respectively to allow driving slide 8 to move locking slide 36 from its locking position forwardly against the force of pull spring 37 to its unlocking position.

The operation of the front and rear devices 6, 7 of the operating mechanism is explained with reference to FIGS. 5A-5C.

Figure 5A:
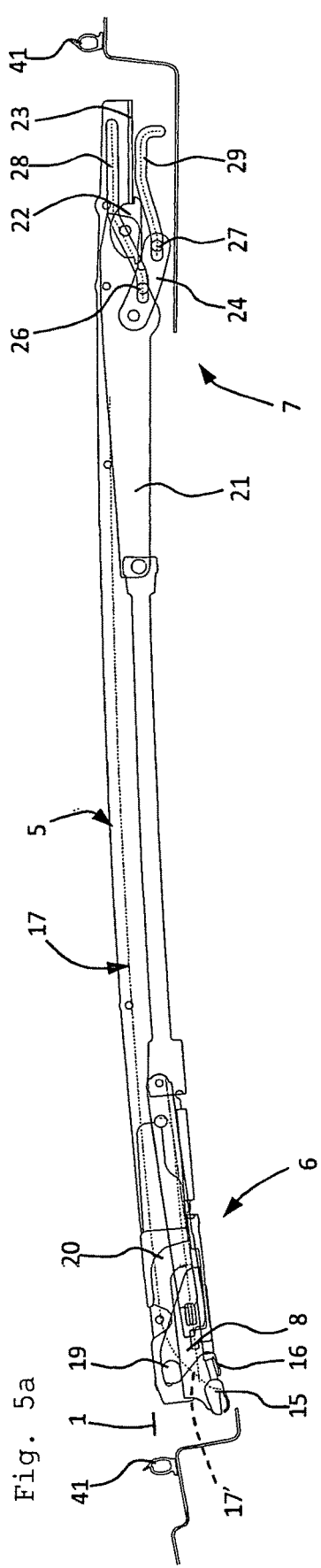
Figure 6:
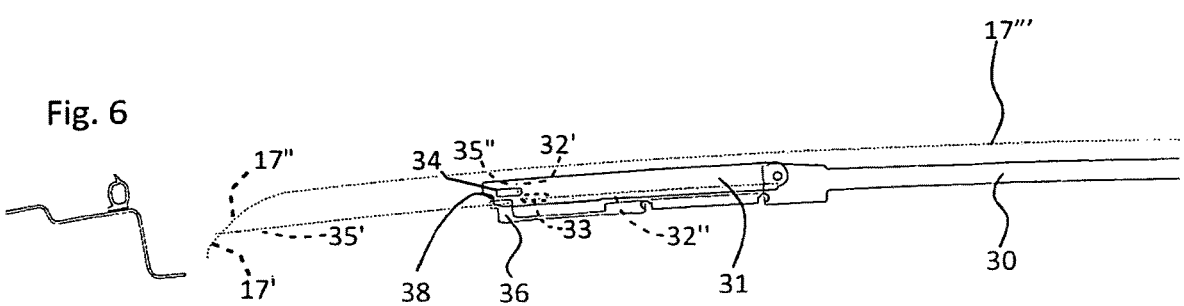
FIG. 6 is a simplified side view similar to FIG. 5d but showing the relationship between cams and curves.

In FIG. 5A, panel 3 (not shown, only panel bracket 5) is in its closed position, that is in its front, downward position within roof opening 1 such that the lower surface of glass sheet 4 (not shown) is in engagement with seal 41 extending along the circumference of roof opening 1. Driving slide 8 is in its front position, and pin 19 of driving slide is positioned at the front end of curve 20 in lever 10 of the front device. Due to this engagement, driving slide 8 rigidly holds lever 10 in vertical direction and therefore prevents vertical movements of panel 3. Slide-shoes 15 and 16 are positioned in the lower front end portion 17', 18' of stationary guide curves 17, 18.

Lifting lever 21 of rear device 7 is in its front downward position with its auxiliary lever 24 in a substantially horizontal position and with guide pins 26, 27 near the front ends of their respective guide curves 28, 29. Slide shoe 22 at the rear end of lifting lever 21 is at a distance from the rear end of panel rail 23.

Figure 5B:
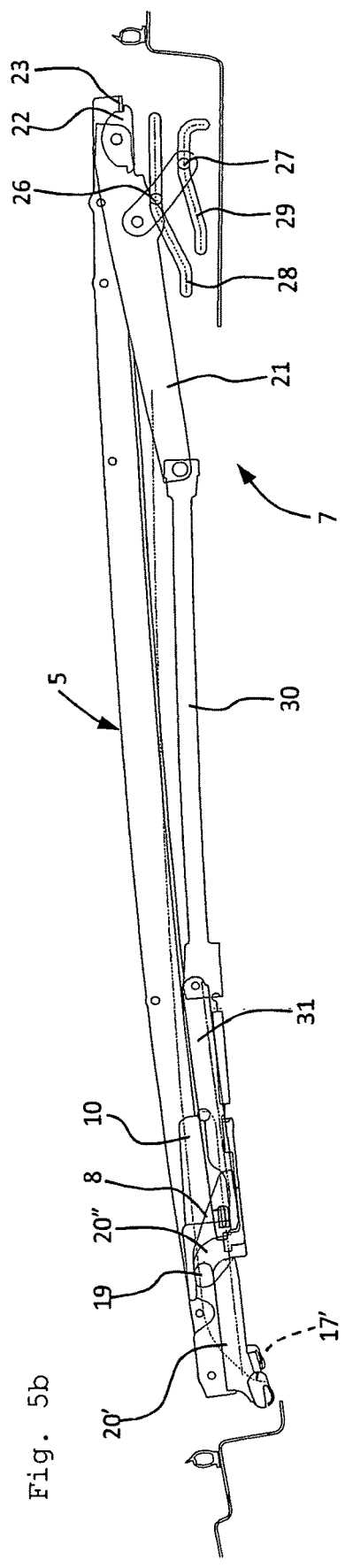

In the position of FIG. 5B, driving slide 8 is moved a distance rearwardly by drive cable 9. Pin 19 of driving slide has traveled through parallel curve portion 20' of curve 20 in lever 10, so that lever 10 has remained stationary.

As described above, coupling member 31 is coupled with driving slide 8 by the engagement of coupling cam 33 of driving slide 8 in vertical locking portion 32' of coupling curve 32 in coupling member 31. Thus coupling member 31 has travelled rearwardly together with driving slide 8 and has driven connecting member 30 and lifting lever 21 of rear device 7. As panel 3 remained stationary in longitudinal direction due to lever 10 remaining in its front position, slide shoe 22 has slid rearwardly along panel rail 23. As guide pins 26, 27 of auxiliary lever 24, traveling rearwardly with lifting lever 21, slide through guide curves 28, 29 such that auxiliary lever is urged to a more upright position, lifting lever 21 is also urged to a more upright position, thereby lifting the rear side of panel bracket 5 and thus of panel 3.

In the position of FIG. 5C, lifting lever 21 has been moved to its maximum rearwardly and upwardly position in which slide shoe 22 is positioned substantially above seal 41 at the rear side of roof opening 1. Auxiliary lever 24 has been moved to a substantially vertical position, thereby providing a stable and rigid support for lifting lever 21 and thus for the rear side of panel 3. Lower guide pin 27 on auxiliary lever 24 is positioned in a substantially vertical guide curve portion of guide curve 29 thereby locking it in longitudinal direction to further stabilize its position.

As pin 19 of driving slide 8 has arrived in curved section 20" of curve 20 in lever 10 it has lifted front end of lever 10 (the rear end is only pivotable and slidable) so that slide-shoes 15 and 16 have moved through front curve portions 17', 17" and 18', 18" (only guide curve 17 is shown) and have arrived in long parallel portion 17''', 18'''' of stationary guide curve 17, 18 of the guide rail.

In the position of FIG. 5C, locking cam 34 of coupling member 31 has moved from parallel portion 35' to vertical locking portion 35" of stationary locking curve 35 so that coupling member 31 cannot move further in longitudinal direction, only in upward direction. Thus coupling member 31 is now locked and therefore rear device 7 is also locking in this position. To ensure that coupling member 31 remains in this position, locking slide 36 is moved rearwardly by pull spring 37 below upwardly moved front end of coupling member 31 such that its locking surface 38 is below coupling member 31 and prevents it from moving downwardly again.

Due to the upward pivoting movement of coupling member 31 coupling cam 33 on driving slide 8 is transferred from vertical coupling curve portion 32' of coupling curve 32 to parallel portion 32" thereof so that a further rearward movement of driving slide 8 can be done without moving coupling member 31, so that front device 6 is operated, while rear device 7 remains stationary.

In FIG. 5D, panel 3 has been moved with its front and rear sides in their upper positions rearwardly parallel to the stationary guide rail, the guide curve groove of which being represented by a dotted line 17'''. As it is shown, driving slide 8 can be moved far rearwardly to a position in which it is positioned side-by-side with lifting lever 21 of rear device 7. Lever 10 of front device 6 is also overlapping lifting lever 21 in longitudinal direction. As front device 6 is relatively compact, and thus front slide-shoes 15, 16 are relatively a short distance in front of driving slide 8, panel 3 can be moved far rearwardly thereby opening roof opening 1 to a large extent. As lifting lever is supported rigidly by auxiliary lever 24 and because slide shoe 22 of lifting lever is positioned far rearwardly above seal 41, panel 3 is in a stable rear position.

The return movement of panel 3 to its closed position is in reverse order as described. One thing should be mentioned and that is how coupling member 31 is released from its position in which it is locked by locking slide 36. This is done by driving slide 8 having its unlocking surface 39 engage with unlocking surface 40 of locking slide 36 thereby moving locking slide 36 in forward direction together with driving slide 8 and against the spring force of pull spring 37. Then locking surface 38 of locking slide 36 moves away from coupling member 31 thereby allowing coupling member 31 to pivot downwardly with coupling cam 33 on driving slide 8 moving from horizontal coupling curve portion 32" to vertical coupling curve portion 32'.

From the foregoing it will be clear that aspects of the invention provide an operating mechanism for a roof system having a front device which provides a stable support for the panel but is also compact so that it enables the panel to be slid rearwardly over a relatively long distance, so that a large part of the roof opening is released by the panel.

The invention is not limited to the embodiment shown in the drawings and described above, which may be varied in different manners within the scope of the invention. Guide pins and cams may have all kinds of shapes and are not limited to the cross-sectional shapes shown in the drawings. The front device could also be used in other operating mechanisms, such as for example tilt-sliding roofs, topsliders and the like. Other movements of the front edge of closure panel could be effected if desired.

The invention claimed is:

1. A roof system or a vehicle having a roof opening in a roof part thereof, comprising:
   a closure panel which is movable between a closed position in which it closes the roof opening and an open position in which it opens the roof opening and is positioned at least partially above an adjoining portion of the roof part;
   a stationary guide rail at each longitudinal side of said roof opening;
   an operating mechanism slidably coupled to each stationary guide rail, the operating mechanisms being joined to the closure panel to operate the closure panel in a longitudinal direction of the vehicle, said operating mechanism comprising:
   a rear device configured to move a rear edge of the closure panel towards a raised position relative to the closed position and above the adjoining portion of the roof part;
   a front device including a lever configured to move a front edge of the closure panel in a vertical direction; and
   a driving slide slidable relative to each guide rail and is drivable by a drive member to move the closure panel both in a vertical and in a horizontal direction through the front device and the rear device;
   wherein a pin-curve assembly connects the lever of the front device to the driving slide;
   wherein the lever is provided with a slide-shoe which is in engagement with a stationary guide curve and is pivotally in engagement with the closure panel; and
   wherein a curve of the pin-curve assembly is provided with a first curve section extending mainly in horizontal direction and allowing a pin of the pin-curve assembly to slide along and thereby allowing the driving slide to move at least the rear side of the closure panel at least in vertical direction, and is provided with a locking curve section extending mainly in vertical direction when the pin is positioned in the locking curve section in order to allow the driving slide to rotate the lever due to a displacement of the slide-shoe of the lever through a curved front portion of the stationary guide curve and to slide the closure panel in longitudinal direction.

2. The roof system according to claim 1, wherein the locking curve section and the first curve section of the pin-curve assembly are provided in the lever and the corresponding pin is provided on the driving slide.

3. The roof system according to claim 1, wherein the lever of the front device is in engagement with two stationary guide curves one on each lateral side of the lever by two slide-shoes.

4. The roof system according to claim 3, wherein the slide-shoes are positioned at the front end of the lever of the front device.

5. The roof system according to claim 3, wherein the lever of the front device is pivotally connected to a panel bracket at a position substantially above the slide-shoes.

6. The roof systems according to claim 1, wherein the stationary guide curve includes a short substantially vertical front portion, a connecting inclined portion and a connecting long portion following the curvature of the roof part.

7. The roof system according to claim 1, wherein the lever of the front device is rotationally supported at its rear end on a pivot which is mounted on a slide which is slidable in the stationary guide rail.

8. The roof system according to claim 1, wherein the rear device is configured to move the rear side of the panel in the vertical direction and which is configured to allow the panel to slide with respect to the rear device when the panel moves above the adjoining portion of the roof part.

9. The roof system according to claim 8, wherein the rear device includes a lifting lever to move the rear side of the panel in the vertical direction, wherein a coupling member is connected to the lifting lever at a first end and is selectively drivingly coupled to the driving slide.

10. The roof system according to claim 9, wherein the lifting lever is supported by an auxiliary lever which is pivotally connected to the lifting lever, the auxiliary lever having first and second guide pins in engagement with first and second stationary guide curves, respectively, to force the auxiliary lever to rotate when the lifting lever is driven by the driving slide.

11. The roof system according to claim 8, wherein the rear device includes a lifting lever pivotally connected to the closure panel, and further comprising a coupling detachably coupling the lifting lever to the driving slide.

12. The roof system according to claim 11, wherein the rear device is connected to the coupling by an elongated connecting member.

13. The roof system according to claim 1, wherein the front device is movable on the stationary guide with movement of the driving slide so as to be positioned at least partly beside the rear device in a most rearward open position of the panel with respect to the roof opening.

* * * * *